United States Patent
Fujimatsu et al.

(10) Patent No.: US 6,811,577 B2
(45) Date of Patent: Nov. 2, 2004

(54) CELL ELECTRODE PLATE, METHOD FOR MANUFACTURING IT, AND NON-AQUEOUS ELECTROLYTE SECONDARY CELL USING THEM

(75) Inventors: Hitoshi Fujimatsu, Ueda (JP); Takashi Iijima, Ina (JP); Takayuki Shirane, Moriguchi (JP); Hiroshi Yoshizawa, Hirakata (JP); Hizuru Koshina, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 325 days.

(21) Appl. No.: 10/049,644

(22) PCT Filed: Jun. 27, 2001

(86) PCT No.: PCT/JP01/05536
§ 371 (c)(1),
(2), (4) Date: Feb. 25, 2002

(87) PCT Pub. No.: WO02/03486
PCT Pub. Date: Jan. 10, 2002

(65) Prior Publication Data
US 2002/0122977 A1 Sep. 5, 2002

(30) Foreign Application Priority Data
Jun. 30, 2000 (JP) .................................. 2000-198170
May 11, 2001 (JP) .................................. 2001-141514

(51) Int. Cl.$^7$ .................... H01M 6/00; H01M 10/00; H01M 2/16
(52) U.S. Cl. .................... 29/623.5; 429/127; 429/134
(58) Field of Search .................... 29/623.5; 429/231.3, 429/231, 131, 134, 127, 162

(56) References Cited

U.S. PATENT DOCUMENTS

| 5,460,904 | A | 10/1995 | Gozdz et al. ............... 429/192 |
| 6,635,385 | B2 * | 10/2003 | Fujimatsu et al. .......... 429/217 |

FOREIGN PATENT DOCUMENTS

| JP | 05094812 | 4/1993 |
| JP | 10050348 | 2/1998 |
| JP | 10334877 | 12/1998 |
| JP | 11288741 | 10/1999 |

OTHER PUBLICATIONS

English Translation of Abstract for JP Appl. No. 10–050348.
English Translation of Abstract for JP Appl. No. 10–334877.
English Translation of Abstract for JP Appl. No. 05–094812.
English Translation of Abstract for JP Appl. No. 11–288741.

* cited by examiner

Primary Examiner—Patrick Ryan
Assistant Examiner—Thomas H. Parsons
(74) Attorney, Agent, or Firm—Greenblum & Bernstein, P.L.C.

(57) ABSTRACT

A method for manufacturing a battery electrode plate includes the steps of mixing a solvent (3) with a polyolefin resin (1); preparing a gel-like solution (5), a gelled solution as a whole having a high viscosity, by heating the mixture of the polyolefin and the solvent at a temperature at which a part or the whole of the polyolefin resin melts; forming an insulation layer (8) by coating the gel-like solution on the surface of the positive electrode plate or negative electrode plate (7); and heating the positive electrode plate or negative electrode plate formed with the insulation layer.

19 Claims, 3 Drawing Sheets

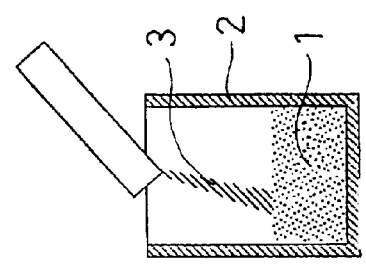
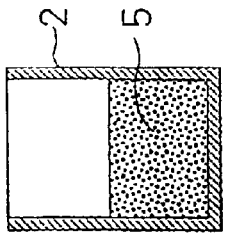
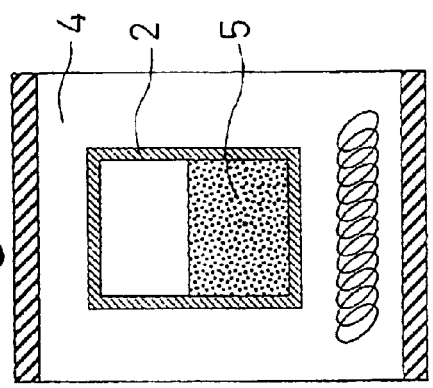
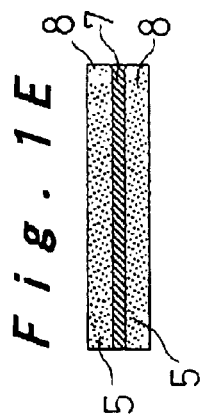
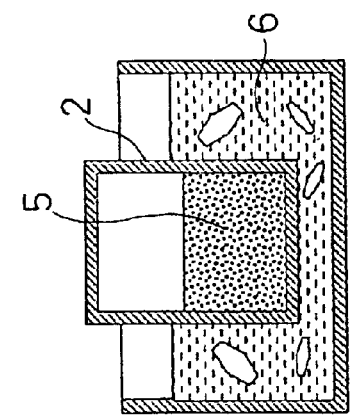
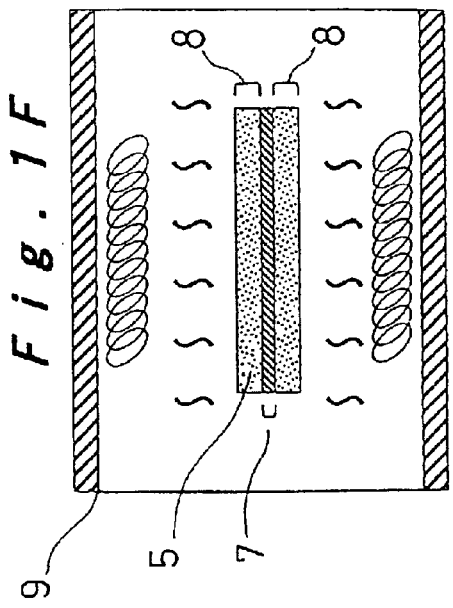

CELL ELECTRODE PLATE, METHOD FOR MANUFACTURING IT, AND NON-AQUEOUS ELECTROLYTE SECONDARY CELL USING THEM

TECHNICAL FIELD

The present invention primarily relates to a method for manufacturing positive and negative electrodes of a nonaqueous-electrolyte rechargeable battery.

BACKGROUND ART

In recent years, there has been an increasing trend of electronic equipment towards portable and cordless design, and demand for small and lightweight rechargeable batteries having high energy density has been growing. Among others, nonaqueous-electrolyte rechargeable batteries typified by lithium rechargeable batteries using lithium as an active material are particularly hoped for as batteries having a high voltage and a high energy density. However, a positive electrode plate, a negative electrode plate, and a separator of such nonaqueous-electrolyte rechargeable batteries are respectively formed independently. A separator that generally occupies a largest area, a negative electrode plate, and a positive electrode plate, in that order, must be smaller in area. Consequently, there is an area that is occupied only by a separator. As a result, a portion of a separator that is not involved in a battery capacity largely occupies a space in the battery, reducing discharge capacity per unit volume of battery.

Further, because a separator, a positive electrode plate, and a negative electrode plate respectively independently exist, a clearance is produced between the separator, and the positive electrode plate or the negative electrode plate. Gases produced by reactions between electrode plate surfaces and the electrolyte, etc. during charging and discharging accumulate in the clearance, deteriorating battery characteristics.

Methods for unitizing an electrode plate and a separator include steps for polymer batteries using heat-fusing (U.S. Pat. No. 5,460,904). With these steps, a separator and an electrode plate are independently prepared and are unitized together by heat-fusing. Further, to make the separator a porous membrane, the steps include a step in which the separator is made to contain a plasticizer when forming a separator membrane, and the plasticizer is extracted after the heat-fusing. Accordingly, the steps are very complex, inviting disadvantages such as lowering in productivity and rise in costs.

Further, alternative methods for unitizing an electrode plate and a separator include a step of coating an insulation layer on an electrode plate, and are disclosed in Japanese Patent Laid-Open Publication Nos. Hei. 10-50348, Hei. 11-288741, and others. With a method disclosed in Japanese Patent Laid-Open Publication No. Hei. 10-50348, a polyethylene wax is heated and melted, and is coated on an electrode plate, and after that the coated layer is perforated with means such as a thermal head. It means that, with this method, the coated resin layer becomes a homogenized membrane in any case, and the layer must be perforated by some means or other to make it a porous membrane so that the layer functions as a separator. Further, in Japanese Patent Laid-Open Publication No. Hei. 11-288741, a typical polymer film forming method is disclosed, in which a polymer material is melted in a solvent, and the solution is coated on an electrode plate. However, because a solvent having an excellent dissolving ability for a polyolefin resin such as polyethylene is not available, preparing an insulation layer membrane with such a common method is extremely difficult. Therefore, in this Patent Publication as well, polyolefin resins are not referred to as a polymer material.

The present invention has been made in light of the conventional problems described above, and an object of the invention is to provide a method for manufacturing a battery electrode plate in which the electrode plate uses as a separator a polyolefin resin such as polyethylene, which is a material relatively low in costs and is stable for use in a battery, a positive electrode plate or a negative electrode plate is unitized with an insulation layer through the coating of the polyolefin resin on the positive electrode plate or the negative electrode plate. Thus the volume of a separator in the space within a battery is minimized, and interfacial bonding between the positive electrode plate or the negative electrode plate and the insulation layer is improved, thereby enhancing battery characteristics.

DISCLOSURE OF THE INVENTION

In order to achieve the object described above, a method for manufacturing a battery electrode plate according to a first aspect of the invention includes the steps of: mixing a solvent with a polyolefin resin used as an insulation layer of a positive electrode plate or negative electrode plate; preparing a gel-like solution, or a gelled solution as a whole having a high viscosity, by heating the mixture of the polyolefin resin and the solvent at a temperature at which a part or the whole of the polyolefin melts; forming an insulation layer by coating the gel-like solution on a surface of the positive electrode plate or negative electrode plate; and drying it by heating the positive electrode plate or negative electrode plate formed with the insulation layer.

In this method for manufacturing a battery electrode plate, the insulation layer that corresponds to a separator and the positive electrode plate or negative electrode plate are made equal in area. Thereby, a portion conventionally occupied only by a separator is utilized, so that discharge capacity per unit volume of battery is improved. At the same time, since the insulation layer and the positive electrode plate or the negative electrode plate are unitized together, better interfacial bonding is provided in comparison with a conventional separator, so that battery characteristics is improved.

Further, a method for manufacturing battery electrode plate according to a second aspect of the invention includes the steps of: mixing a polyolefin resin with a solvent; preparing a gel-like solution, or a gelled solution as a whole having high viscosity, by heating the mixture at a temperature where a part or the whole of the polyolefin melts; adding a fluororesin and/or an imide resin to the polyolefin resin at any stage between the state where the polyolefin resin exists alone and the state of the gel-like solution; coating the gel-like solution on a surface of a positive electrode plate or negative electrode plate; and drying it by heating the positive electrode plate or the negative electrode plate coated with the gel-like solution to form the gel-like solution into an insulation layer on the positive electrode plate or negative electrode plate.

According to the method for manufacturing an electrode plate according to the second aspect of the invention, heat resistance of the insulation layer formed mainly from a polyolefin resin is improved. Among different resins, a polyolefin resin has a lower melting temperature. When a battery using a polyolefin resin is exposed to an environment of high temperatures exceeding a melting temperature of a polyolefin resin due to users' mishandling, the polyolefin resin may melt to deform and drop. However, the added fluororesin and/or imide resin having a higher melting temperature provides a state in which particles of resins are connected together, and fluororesin and/or imide resin that is not melted prevents deformation and drop of the polyolefin resin.

BRIEF DESCRIPTION OF THE DRAWINGS

FIGS. 1A to 1F schematically illustrate each of the manufacturing steps of a battery electrode plate according to a first embodiment of the invention;

BEST MODE FOR CARRYING OUT THE INVENTION

Figure 2:
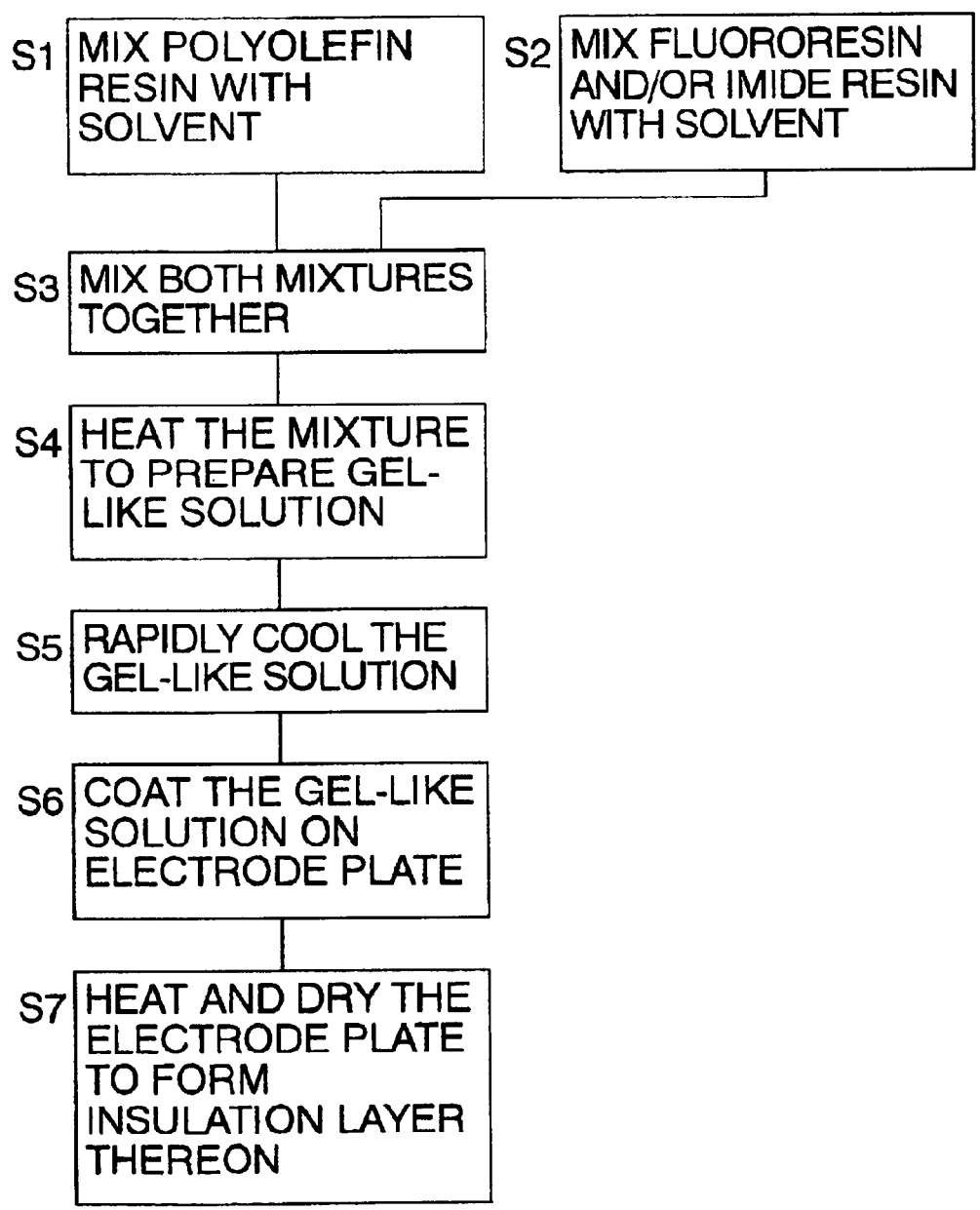
FIG. 2 is a flow chart showing procedures of the manufacturing steps of a battery electrode plate according to a second embodiment of the invention.

Preferred embodiments of the invention will be described below referring the drawings. FIGS. 1A to 1F schematically illustrate each of manufacturing steps for realizing a manufacturing method for a battery electrode plate according to the invention. In the step in FIG. 1A, fibrous polyethylene powder is put in a vessel 2 for heating as a polyolefin resin 1 necessary for preparing a gel-like solution 5 used as an insulation layer, and any one of toluene, decalin, tetrachloroethane, xylene, dichlorobenzene or N-methylpyrrolidone is put as a solvent 3 in the vessel 2. At this time, in the vessel 2, the polyolefin resin 1 is not dissolved in the solvent 3, but it is only mixed with it. Polyethylene that is used as the polyolefin resin 1 is inactive in the solvent 3 because it has low water- and oil-repellency, and has excellent chemical resistance.

Next, as shown in FIG. 1B, the vessel 2 in a glass-sealed state is received in a heating chamber 4, and is heated so that the polyolefin resin 1 and solvent 3 inside the vessel reach a predetermined temperature. Here the melting point of the polyolefin resin 1 is lowered because of the solvent 3, so that the predetermined temperature is set at a temperature which is equal to or below a melting point of the polyolefin resin 1, and at the same time, equal to a temperature at which a part or the whole of the polyolefin resin 1 melts. The predetermined temperature is most preferably 140° C. when the polyolefin resin 1 is polyethylene. Thus a part or the whole of the polyethylene as the polyolefin resin 1 melts out in the solvent 3, gelled in a solution state as a whole having a high viscosity, and thus a gel-like solution 5 is prepared.

Next, the gel-like solution 5 is, as shown in FIG. 1C for example, cooled so that the temperature rapidly lowers to a temperature of almost 0° C. by means such as the immersion of the vessel 2 in water 6 with ice. When the gel-like solution 5 is rapidly cooled as described above, the gelled state of polyethylene when cooled is made uniform, and the gel-like solution 5 is obtainable, with equal quality and with good reproducibility. Productivity is therefore increased when the method is put to practical use, and temperature setting in a drying step that will be described below is facilitated. Contrary to this, when the gel-like solution 5 is gradually cooled, the gel-like solution 5 has uneven quality depending on a temperature history such as cooling time or temperature differences during the cooling step.

The gel-like solution 5 is, as shown in FIG. 1D, once brought to a room temperature, and then, as shown in FIG. 1E, coated under pressure on the surfaces of both sides of the positive electrode plate or negative electrode plate 7 with a predetermined thickness to form insulation layers 8.

Next, the positive electrode plate or negative electrode plate 7 formed with the insulation layers 8 is, as shown in FIG. 1F, received in a drying chamber 9 for heating. At this time, the drying chamber 9 is set at a temperature that is equal to or higher than a boiling point of a solvent in the gel-like solution 5, and at the same time, equal to or lower than a melting point of the polyolefin resin 1. As the gel-like solution 5 is heated with the temperature described above, the solvent 3 contained in the gel-like solution 5 evaporates and scatters, causing a part of polyolefin resin to melt out and precipitate on and near the surface of the polyolefin resin 1. The precipitated resins bond together to become porous, so that the insulation layers 8 that are porous are formed. Finally, the electrode plate is stamped or cut in predetermined dimensions to make a desired battery electrode plate.

In an electrode plate obtained through the steps described above, a positive electrode plate or a negative electrode plate is unitized with the insulation layers 8 that correspond to a conventional separator. Consequently, a larger electrode plate area is made available, and discharge capacity per unit volume of battery is improved.

Further, because interfacial bonding ability between an insulation layer and a positive electrode plate or negative electrode plate is improved, so that battery characteristics are improved.

The embodiment described above is a case of an example where polyethylene is used as the polyolefin resin 1. However, the same effect can be obtained by the selection of an appropriate solvent that can be gelled when a material having crystalline structure other than polyethylene, such as polypropylene, polymethylpentene or polybutene, is used as the polyolefin resin 1.

Examples of manufacturing methods that the present inventors tested will be described below.

EXAMPLE 1

High density polyethylene powder as the polyolefin resin 1 and dichlorobenzene as the solvent 3 were mixed, and the mixture was heated until the whole mixture reached a temperature of 115° C. to prepare the gel-like solution 5 having a state where only the surface of the polyethylene was viscous. The high density polyethylene powder used has a density of 0.94 g/cm$^3$ and a molecular weight of 125000. After rapidly cooling the gel-like solution 5 to 0° C., it was coated on a negative electrode plate with graphite as an active material. The electrode plate was dried and then cut to obtain a negative electrode plate for a lithium rechargeable battery. LiCoO$_2$ was used as an active material of the positive electrode plate.

A battery prepared with the electrode plates described above had better discharge capacity per unit volume of battery than batteries using a common separator, and it also showed excellent high load characteristics.

Each of the examples described below is achieved by the change of a part of the example 1 described above. Only parts that were changed from the example 1 will be described below for descriptions of each example.

EXAMPLE 2

Tetralin was used as the solvent 3, and the mixture of this solvent 3 and polyethylene powder was heated until the whole mixture reached a temperature of 105° C.

EXAMPLE 3

Decalin was used as the solvent 3, and the mixture of this solvent 3 and polyethylene powder was heated until the whole mixture reached a temperature of 110° C.

EXAMPLE 4

Low density polyethylene powder was used as the polyolefin resin 1. The mixture of the low density polyethylene powder and the solvent 3 was heated until the whole mixture reached a temperature of 90° C. The low density polyethylene powder has a density of 0.92 g/cm$^3$ and a molecular weight of 115000. When low density polyethylene was used, the gel-like solution 5 was able to be obtained at a temperature of 90° C., a relatively low temperature; the method may therefore be advantageous when practically used in the industry.

EXAMPLE 5

Polypropylene powder (melting point from 158 to 160° C.) was used as the polyolefin resin 1, and the mixture of this polypropylene powder and the solvent 3 was heated until the whole mixture reached a temperature of 140° C.

EXAMPLE 6

Polymethylpentene powder was used as the polyolefin resin 1, and the mixture of this polymethylpentene powder and the solvent 3 was heated until the whole mixture reached a temperature of 150° C.

EXAMPLE 7

Polybutene powder (melting point from 126 to 128° C.) was used as the polyolefin resin 1, and the mixture of this polybutene powder and the solvent 3 was heated until the whole mixture reached a temperature of 120° C.

EXAMPLE 8

The gel-like solution 5 is coated on a positive electrode plate or negative electrode plate 7 with LiCoO$_2$ as an active material.

In nonaqueous-electrolyte rechargeable batteries using a battery electrode plate obtained by each of the examples described above, it was also confirmed that desired charge-discharge cycle life was secured, excellent storage characteristics were obtained, and also discharge capacity was improved. Further, any battery obtained by each of the examples described above is prepared at costs lower than those of batteries using separators of polyethylene.

Portable electronic equipment installed with a battery and placed by heating equipment, a heater or a fire is exposed to extraordinary high temperatures. Even in such a case, it is also demanded to secure safety so that the battery does not explode or ignite, and UL standards set as guidelines for such demand define stringent safety requirements. Environment tests defined in "UL safety standard for batteries of household and commercial use (UL2054)" include a heating test, which requires that a battery should not explode or ignite even when environment temperature of a battery is raised to a temperature of 150±2° C. and this temperature is kept for 10 minutes. In order to secure safety of such a battery after having been left for relatively long hours under a high temperature environment, improvement of heat resistance of the insulation layer 8 is essential.

In each of second and third embodiments of the present invention, a fluororesin and/or an imide resin is added to the polyolefin resin described in the first embodiment in order to form an insulation layer having high heat resistance, and nonaqueous-electrolyte rechargeable batteries that satisfy the heating test defined in the UL safety standard are constituted with the methods in the embodiments.

A method for manufacturing a battery electrode plate according to the second and third embodiments will be described below. In the second and third embodiments, steps of the manufacturing methods are shown in flow charts, in which a step constitution for executing steps such as mixing, heating, cooling, and drying are common to the states shown in FIGS. 1A to 1F for the first embodiment.

FIG. 2 is a flow chart showing manufacturing steps of a battery electrode plate according to the second embodiment. First, in a first step (S1), the polyolefin resin 1 is mixed with the solvent 3. More specifically, powder-like polyethylene, polypropylene or the like, or more preferably, these materials in fibrous powder can be adopted as the polyolefin resin 1, and toluene, N-methylpyrrolidone or the like can be adopted as the solvent 3. Here in the first step (S1), a combination of fibrous polyethylene powder and N-methylpyrrolidone were adopted. This step is common to the step shown in FIG. 1A for the first embodiment.

Further, in a second step (S2), the solvent 3 is mixed with a powder-like fluororesin and/or imide resin. More specifically, a combination of polyvinylidene fluoride as a fluororesin and N-methylpyrrolidone as the solvent 3, and a combination of polyimide as an imide resin and acetone as the solvent 3 can be applied. What is suited as the solvent 3 in the combinations is such that it melts a part of or the whole of resin, and its kind is not particularly limited. Here, polyvinylidene fluoride as a fluororesin and N-methylpyrrolidone as the solvent 3 are adopted to prepare a mixture in which the surface of the polyvinylidene fluoride is melted by the N-methylpyrrolidone. An adding ratio of a fluororesin and/or imide resin to a polyolefin resin is 5% or more, and more preferably 10% or more, of the polyolefin resin 1. Further, either of the steps 1 and 2 (S1 and S2) may be conducted first or they may be conducted in parallel.

Next, in a third step (S3), the mixture of a fluororesin and/or imide resin and the solvent 3 prepared in the second step is mixed with the mixture of the polyolefin resin 1 and the solvent 3 prepared in the first step described above, so that a mixture of the two is prepared. In the mixture of the two, polyethylene is in a state in which it is only mixed with N-methylpyrrolidone without melting into it, and polyvinylidene fluoride is mixed in a state in which its surface is melted.

Next, in a step 4 (S4), the mixture of the two kinds is heated up to a temperature equal to or below a melting point of the polyolefin resin 1, and at the same time, equal to a temperature at which a part or the whole of the polyolefin resin 1 melts. Here, because the polyolefin resin 1 is polyethylene, 140° C. is the most preferable temperature. When heated, a part or the whole of the polyethylene melts out into the solvent 3, and the polyvinylidene fluoride having a melted surface is mixed into the solution to become the gel-like solution 5, a gelled solution as a whole having a high viscosity.

Next, in a fifth step (S5), the gel-like solution is cooled so that its temperature rapidly lowers to a temperature of almost 0° C. When a gel-like solution is rapidly cooled as described above, the gelled state of polyethylene when cooled is homogenized, and a gel-like solution is obtainable, with equal quality and with good reproducibility. This enhances productivity when the method is put to practical use, and facilitates temperature setting in a drying step that will be described below.

Next, in a sixth step (S6), after once brought to a room temperature, the gel-like solution is coated under pressure on the surfaces of the both sides of the positive electrode plate or negative electrode plate 7 with a predetermined thickness.

Next, a drying step is executed in a seventh step (S7), in which the positive electrode plate or negative electrode plate 7 coated with the gel-like solution is heated. The heating temperature at this time is set at a temperature equal to or more than a boiling point of a solvent in the gel-like solution, and at the same time, equal to or below a melting point of the polyolefin resin 1. In the gel-like solution 5, when the positive electrode plate or negative electrode plate 7 is heated with the temperature described above, the solvent 3 contained in the gel-like solution 5 evaporates and scatters, causing a part of polyolefin resin to solve out and precipitate on and near the surface of the polyolefin resin 1. The precipitated resins are bonded together to become porous, so that a porous insulation layer is formed.

When heated this way, the solvent 3 evaporates and scatters to form the insulation layer 8, a solid state of the polyolefin resin 1 containing a fluororesin and/or an imide resin, is formed on the positive electrode plate or negative electrode plate 7. Then, a desired battery electrode plate is obtained by the stamping or cutting of this electrode plate.

The electrode plate obtained by the steps described above has the positive electrode plate or negative electrode plate unitized with the insulation layer 8 that corresponds to a separator. Consequently, the area of electrode plate is made larger and discharge capacity per unit volume of battery is improved. Further, interfacial bonding ability between the positive electrode plate or negative electrode plate 7 and the insulation layer 8 is improved, so that-battery characteristics are enhanced.

Further, because a fluororesin and/or an imide resin is added to the polyolefin resin 1 in the electrode plate prepared in the second embodiment, heat resistance is improved. Accordingly, safety of a battery produced with this electrode is secured when the battery is exposed to high temperatures. It means that the polyolefin resin 1 of which at least the surface is melted, and a fluororesin and/or an imide resin is in a state connected together at respective melted parts. Therefore, even in a state where a battery is exposed to a high environment temperature and the temperature exceeds a melting temperature of the polyolefin resin 1 to melt it, the connection between the polyolefin resin 1 and the fluororesin and/or the imide resin having high melting temperature obstructs a flow of the insulation layer 8 caused by melting, so that internal short-circuiting or the like caused by the flow of the insulation layer 8 is prevented.

In the second embodiment described above, when adding a fluororesin and/or an imide resin to the polyolefin resin 1, the resins are first respectively mixed with the solvent 3, and then the respective mixtures are mixed together. However, the gel-like solution 5 in which a fluororesin and/or an imide resin is added to the polyolefin resin 1 may be prepared in such a manner that respective resins in a powder state are first mixed together, and then the mixture is mixed with the solvent 3.

Next, a method for manufacturing a battery electrode plate according to the third embodiment will be described below referring to the flow chart in FIG. 3. With regard to steps common to those in the first and second embodiments, only a brief description will be given.

Figure 3:
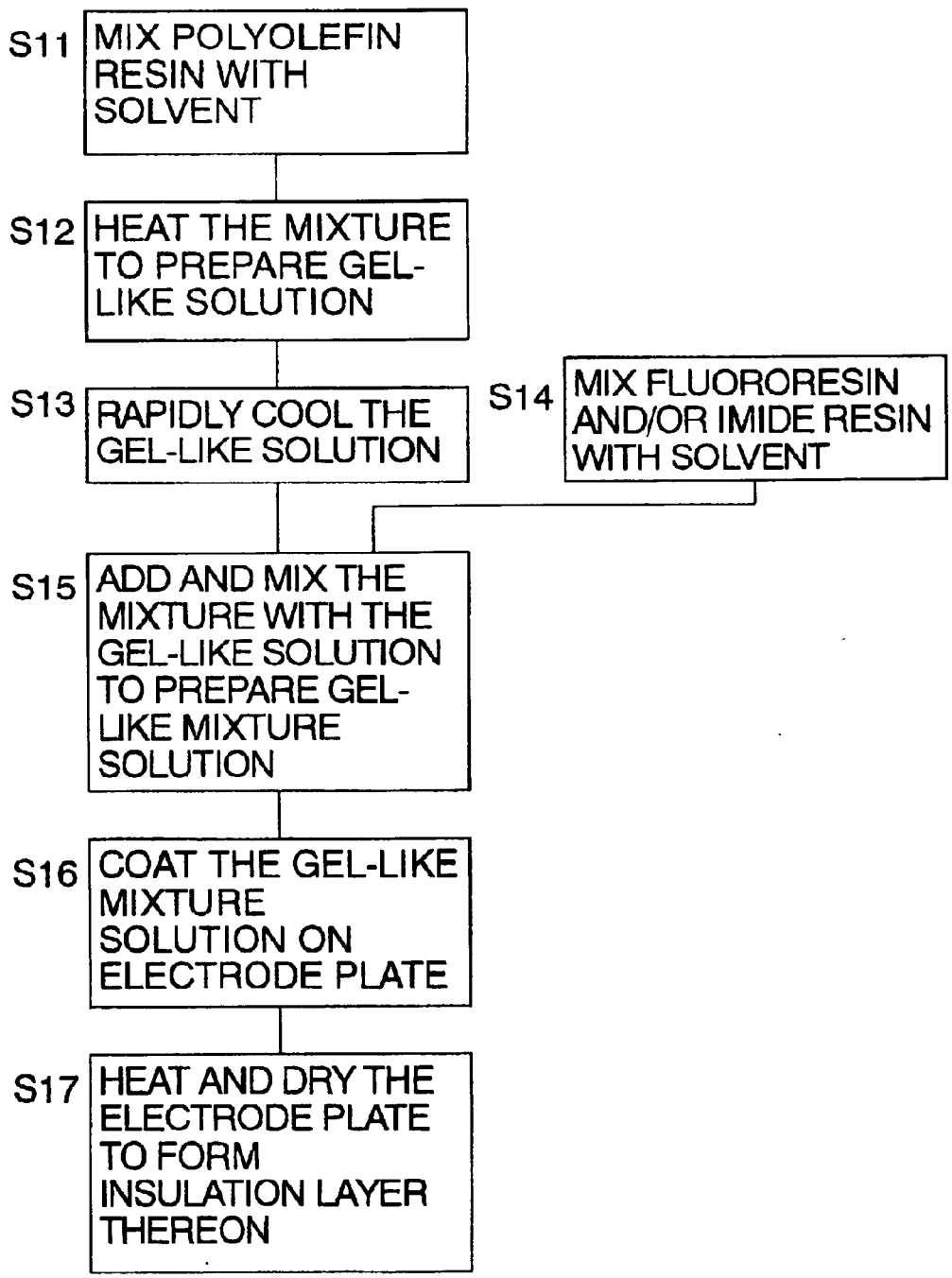
FIG. 3 is a flow chart showing procedures of the manufacturing steps of a battery electrode plate according to a third embodiment of the invention.

In FIG. 3, procedures from a first step (S11) through a third step (S13) are the same as those in the first embodiment. The polyolefin resin 1 is mixed with the solvent 3 (S11), and the mixture is heated so as to melt a part or the whole of the polyolefin resin 1 to prepare the gel-like solution 5 (S12). After then, the gel-like solution 5 is rapidly cooled to stabilize its quality (S13).

Next, a fluororesin and/or an imide resin is mixed with the solvent 3 (S14). As described above, the solvent 3 adopted is such that it melts a part or the whole of the fluororesin and/or the imide resin, and in the mixture obtained, at least the surfaces of the fluororesin and/or the imide resin are melted in the solvent 3.

Next, the mixture is added and mixed with the gel-like solution 5 to prepare a gel-like mixture solution (S15). In the gel-like solution 5, a part or the whole of the polyolefin resin 1 is melted in the solvent 3 by the heating in the second step, while a part or the whole of the fluororesin and/or the imide resin added in the gel-like solution 5 is also melted in the solvent 3. Consequently, when the mixing for preparing the gel-like mixture solution is made, the solution in which the melted portions are connected together is prepared.

Next, the gel-like mixture solution is coated on the positive electrode plate or negative electrode plate 7 with a predetermined thickness (S16). Then the positive electrode plate or negative electrode plate 7 is heated in a drying step to evaporate the solvent 3 from the coated gel-like mixture solution, so that a porous insulation layer is prepared (S17). The solvent 3 scatters by the heating, and the insulation layer 8 is formed on the positive or negative electrode plate 7 that is the polyolefin resin 1, containing the fluororesin and/or imide resin, in a solid state. Then, by stamping or cutting of the electrode plate, a desired battery electrode plate is obtained.

In the electrode plate produced by the third embodiment described above, a fluororesin and/or an imide resin is added to the polyolefin resin 1 in the same way as the second embodiment. Consequently, heat resistance is improved and safety is secured when a battery using this electrode plate is exposed to high temperatures.

INDUSTRIAL APPLICABILITY

An electrode plate area is made larger by the manufacturing method in accordance with the present invention. This improves bonding between a positive electrode plate or negative electrode plate and a surface of an insulation layer that corresponds to a conventional separator. The method is therefore useful in enhancing discharge capacity per unit volume of battery, improving battery characteristics such as cycle characteristics.

What is claimed is:

1. A method of manufacturing a battery electrode plate, comprising the steps of:
    mixing a solvent with a polyolefin resin;
    preparing a gel-like solution that is a gelled solution as a whole having a high viscosity by heating the mixture of the polyolefin resin and the solvent at a temperature at which a part or the whole of the polyolefin resin melts;
    forming an insulation layer by coating the gel-like solution on a surface of a positive electrode plate or negative electrode plate; and
    drying the insulation layer by heating the positive electrode plate or negative electrode plate formed with the insulation layer.

2. The method of manufacturing a battery electrode plate according to claim 1, wherein the gel-like solution is rapidly cooled, and after that it is coated on the positive electrode plate or negative electrode plate so that the electrode plate and the insulation layer are unitized.

3. The method of manufacturing a battery electrode plate according to claim 1, wherein a heating temperature in the drying step is set at a temperature equal to or above a boiling point of the solvent in the gel-like solution, and at the same time, equal to or below a melting point of the polyolefin resin.

4. The method of manufacturing a battery electrode plate according to claim 1, wherein polyethylene is used as the insulation layer, the polyethylene is mixed with the solvent, and the mixture is heated up to a temperature at which the polyethylene is thoroughly uniformly dissolved so as to prepare the gel-like solution.

5. The method of manufacturing a battery electrode plate according to claim 4, wherein the-polyethylene used as the insulation layer is fibrous.

6. A battery electrode plate prepared by the manufacturing method according to claim 1.

7. A nonaqueous-electrolyte rechargeable battery provided with the battery electrode plate according to claim 6.

8. A method of manufacturing a battery electrode plate comprising the steps of:

mixing a polyolefin resin with a solvent;

preparing a gel-like solution that is a gelled solution as a whole having a high viscosity by heating the mixture to a temperature at which a part or the whole of the polyolefin resin melts;

adding a fluororesin and/or an imide resin to the polyolefin resin at any stage from the state where the polyolefin resin exists alone to the state of the gel-like solution;

coating the gel-like solution on a surface of a positive electrode plate or negative electrode plate; and drying the gel-like solution to form the solution into an insulation layer of the positive electrode plate or negative electrode plate by heating the positive electrode plate or negative electrode plate coated with the gel-like solution.

9. The method of manufacturing a battery electrode plate according to claim 8, wherein the fluororesin and/or the imide resin mixed with the solvent is added to the mixture of the polyolefin resin and the solvent.

10. The method of manufacturing a battery electrode plate according to claim 8, wherein the fluororesin and/or the imide resin mixed with the solvent is added to the gel-like solution.

11. The method of manufacturing a battery electrode plate according to claim 8, wherein the fluororesin and/or the imide resin is added to the polyolefin resin, and the mixture is mixed with the solvent.

12. The method of manufacturing a battery electrode plate according to claim 8, wherein the gel-like solution is rapidly cooled, and after then is coated on the positive electrode plate or negative electrode plate.

13. The method of manufacturing a battery electrode plate according to claim 8, wherein a heating temperature in the drying step is set at a temperature equal to or above a boiling point of the solvent in the gel-like solution, and at the same time, equal to or below a melting point of the polyolefin resin.

14. The method of manufacturing a battery electrode plate according to claim 8, wherein polyethylene is used as the polyolefin resin.

15. The method of manufacturing a battery electrode plate according to claim 14, wherein the polyethylene is fibrous.

16. The method of manufacturing a battery electrode plate according to claim 8, wherein polyvinylidene fluoride is used as the fluororesin.

17. The method of manufacturing a battery electrode plate according to claim 8, wherein polyimide resin is used as the imide resin.

18. A battery electrode plate prepared by the manufacturing method according to claim 8.

19. A nonaquaous-electrolyte rechargeable battery provided with the battery electrode plate according to claim 18.

* * * * *